UNITED STATES PATENT OFFICE.

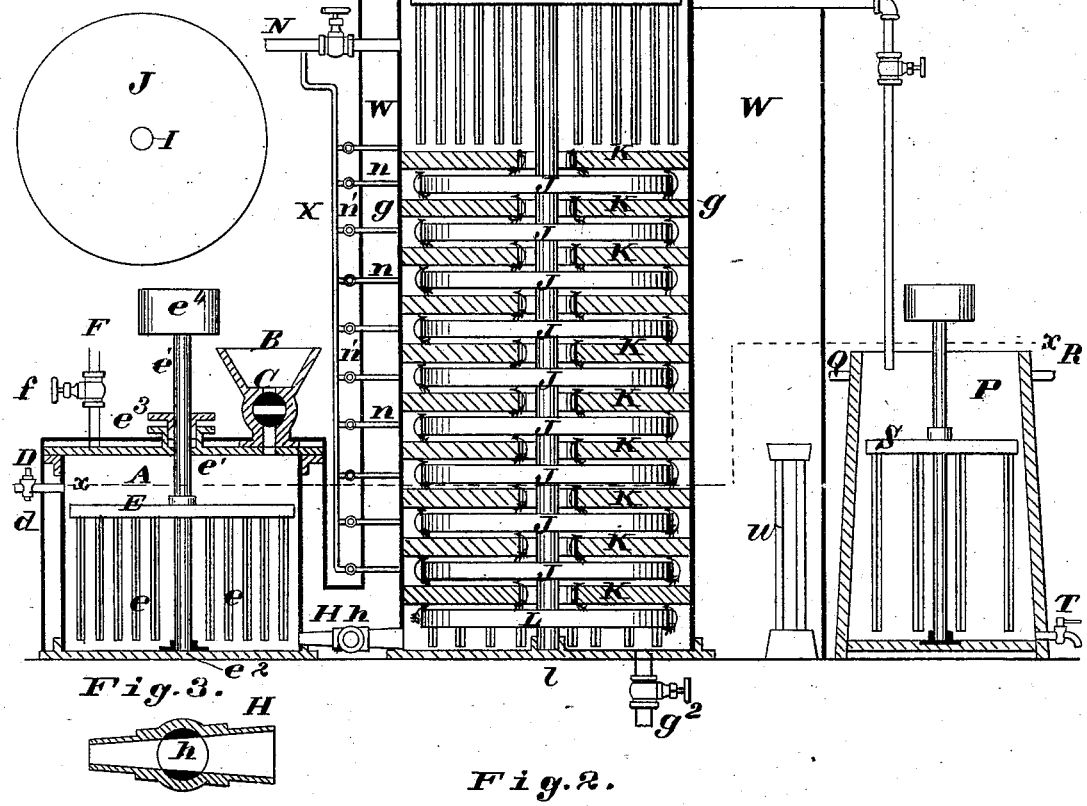

HUGH M. THOMPSON, OF ST. LOUIS, MISSOURI.

AMALGAMATOR.

SPECIFICATION forming part of Letters Patent No. 255,209, dated March 21, 1882.

Application filed December 8, 1880. (No model.)

*To all whom it may concern:*

Be it known that I, HUGH M. THOMPSON, of St. Louis, Missouri, have made a new and useful Improvement in Amalgamators, of which the following is a full, clear, and exact description, reference being had to the annexed drawings, making part of this specification, in which—

Figure 1 is a vertical section of the amalgamator; Fig. 2, a horizontal section taken on the line $x\,x$ of Fig. 1; Fig. 3, a detail, being a sectional view of the pipe leading from the mixing-chamber; and Fig. 4, a plan of one of the rotating disks.

The same letters denote the same parts.

The present invention relates to the mixing-chamber and details immediately therewith connected, to the connection between the mixing and amalgamating chambers, to the construction of the upper part of the amalgamating-chamber, and to the combination of stationary and movable disks and stirrer at the bottom of the amalgamating-chamber.

Referring to the drawings, A represents an inclosed mixing-chamber, wherein the crushed ore is placed and mixed with water, the ore being fed into the chamber, say, from the hopper B and past the valve C. Water is delivered into the chamber through a pipe, D, having the cock $d$.

E represents a mixer consisting of the teeth or fingers $e$ and the shaft $e'$. The latter is held and rotated in the bearings $e^2\,e^3$, and it extends above the chamber and is furnished with a pulley, $e^4$.

The ore and water are mixed in the usual manner. By means of steam, compressed air, or water entering the chamber through a pipe, F, having a cock, $f$, any desirable pressure can be exerted upon the contents of the mixing-chamber, and ultimately upon the contents of the amalgamating-chamber. The ore mixture passes from the mixing-chamber into the amalgamating-chamber G, being delivered into the latter at the bottom thereof and through the pipe H. The last-named pipe has a cock, $h$. The chamber G is an upright inclosed cylinder of suitable materials and proportions.

I represents a shaft held and turning in the bearings $i\,i'$, and provided with a series of plates or disks, J J J.

K K K represent a series of annular plates or disks fixed in the chamber G, (being attached to or supported in the shell $g$,) and arranged to alternate with the disks J J J, the disks J J J and K K K in practice being arranged about one-fourth of an inch apart. The disks J and K are preferably roughened. The disks J in diameter are slightly smaller than the cylinder G, and the central openings in the disks K are slightly larger than the shaft I, thus forming a succession of connected compartments extending from the bottom of the chamber G upward to above the uppermost disk, and in which compartments the amalgamating is effected. The disks J and K not only furnish an improved means for bringing the mercury and ores into intimate contact, but also serve another purpose—to excite galvanic action during the amalgamating operation—one set of the disks—say the disks J—being made of copper, steel, or other suitable material, and the other set, K, being of iron or other suitable material.

In operation the chamber G is suitably charged with the mercury and the ore mixture introduced. The mercury can be introduced at any suitable point, say by means of the cock $g'$. The ore mixture, as stated, enters the chamber G at the bottom thereof, ascending thence throughout the winding spaces between the plates J and K and up along the shaft I, the movement being caused by the pressure that, by means of the steam, compressed air, or water entering through the pipe F, is exerted upon the contents of the apparatus. At this stage of the operation the cocks $c\,d$ are closed and the cocks $f\,h$ opened. Rotary motion by any suitable means is imparted to the shaft I and disks J J J, agitating the contents of the amalgamating-chamber and bringing the ore and mercury well in contact. The mechanical means are supplemented by the galvanic current which is created in the battery formed by the disks J and K and the mercury present, and also by the pressure above described, the three agencies coacting to increase the efficiency of the operation. At its lower end the shaft I is preferably furnished with a stirrer, L, and at its upper end it is provided with a device, M, similar in form to the mixer, and which serves, in connection with a current of water flowing into the chamber G at N and flowing out of the chamber through the pipe O, to agitate the contents of the chamber above the uppermost disk and to precipitate the principal portion of the amalgam which arises above the disks. The water operates to thin the fluid contents above the disks, and thus cause the heavier amalgam to settle down in the chamber, and to save such small portion of the amalgam as may flow off through the pipe O the latter is arranged to discharge into a trap, P. The trap may have a stream of water flowing into it at Q and out of it at R, and it may also have a stirrer and washer, S. The water-current carries the dirt away from the trap, leaving the amalgam to be collected by the discharge T.

The amalgam in the chamber G may be drawn off at $g^2$. The top $g^3$ of the chamber G is removable. The side of the chamber G by means of a removable plate or door, U, may be opened, enabling the interior of the chamber, and particularly the disks J K, to be inspected and cleaned. While the water-current is flowing through the upper part of the chamber G the pressure may be relieved.

The internal shape of the pipe H is shown in Fig. 3, the perforation enlarging from the mixing-chamber to the amalgamating-chamber. The aim and effect of this shape is to prevent the pipe from becoming choked.

Partly to inclose the amalgamator from the weather, which, when cold, is liable to interfere with the proper working of the apparatus, but also to facilitate the amalgamating at all times, the chambers A and G, especially the latter, are surrounded by a hot-air chamber, W, the heat in which may be sustained in any suitable manner—as, for instance, by a steam-coil, $w$. The chamber W has doors $w'$.

To readily clean the amalgamating-chamber, a water-pipe, X, leading, say, from the pipe N, extends down past the amalgamating-chamber, and is provided with a series of branches, $n\ n\ n$, having cocks $n'\ n'\ n'$, the branch pipes being arranged to deliver the water into the various spaces between the disks J K.

A special advantage of the present improvement is that by means thereof the free gold is more effectually saved. This is due partly to the mode of introducing the ore mixture into the amalgamating-chamber—viz., at the lowest level therein, and moving it thence upward. This brings the ore and mercury very intimately in contact. The pressure employed aids in mixing the ore and mercury, and the improved result is also partly due to the shape and arrangement of the disks J K, as thereby the fluid contents of the amalgamating-chamber are spread into a very shallow film.

I am aware a galvanic current has heretofore been employed in amalgamating, and I do not broadly claim this feature of the improvement. A rotating shaft and arms have also been used to agitate the contents of an amalgamator.

I claim—

1. The chamber G, having the inlet N and outlet O, the shaft I, and stirrer M, combined substantially as described, and for the purpose set forth.

2. The combination of the chamber A, mixer E, hopper B, valve C, and pipes D and F, substantially as described, and for the purposes set forth.

3. In an amalgamator, the chambers A and G, connected by the pipe H, the latter enlarging, as described, from the mixing-chamber to the amalgamating-chamber.

4. The combination of the amalgamating-chamber G, having the inlet at the bottom thereof, and the shaft I and stirrer L, together with the disks K K K and J J J, substantially as described.

HUGH M. THOMPSON.

Witnesses:
C. D. MOODY,
CHARLES PICKLES.